United States Patent [19]

Rost

[11] 4,138,307

[45] Feb. 6, 1979

[54] AXIALLY ADJUSTABLE TIRE CONSTRUCTION DRUM

[75] Inventor: Harry Rost, Munich, Fed. Rep. of Germany

[73] Assignee: Metzeler Kautschuk AG, Fed. Rep. of Germany

[21] Appl. No.: 815,196

[22] Filed: Jul. 12, 1977

[30] Foreign Application Priority Data

Jul. 9, 1976 [DE] Fed. Rep. of Germany ....... 2630893

[51] Int. Cl.² .......................................... B29H 17/14
[52] U.S. Cl. ..................................... 156/415; 156/419
[58] Field of Search ............... 156/123, 133, 394, 414, 156/415, 416, 417, 418, 419, 420

[56] References Cited

U.S. PATENT DOCUMENTS

| | | | |
|---|---|---|---|
| 2,335,169 | 11/1943 | Bostwick | 156/415 |
| 3,077,917 | 2/1963 | Appleby | 156/416 |
| 3,154,455 | 10/1964 | Nebout | 156/416 |
| 3,156,601 | 11/1964 | Henley | 156/415 |
| 3,160,545 | 12/1964 | Burton | 156/415 |
| 3,503,829 | 3/1970 | Menell et al. | 156/416 |
| 3,867,230 | 2/1975 | Van Horn et al. | 156/414 |

FOREIGN PATENT DOCUMENTS

| | | | |
|---|---|---|---|
| 409164 | 5/1968 | Australia | 156/414 |
| 516536 | 9/1955 | Canada | 156/416 |

*Primary Examiner*—John E. Kittle
*Attorney, Agent, or Firm*—Armstrong, Nikaido, Marmelstein & Kubovcik

[57] ABSTRACT

An axially and radially adjustable construction drum for pneumatic tires in which the drum has a variable width and is radially extensible and comprises two basic members, the relative distance between which is adjustable on an internal tube through a spindle and a screwthreaded sleeve with screw thread portions in opposite directions, in which the basic members support ring segments whose external surfaces form approximately cylindrical working surfaces and which are radially adjustable through bellows and on which is situated a resilient bandage with inflatable members disposed therebelow for holding over the edges of plies and between which is retained a middle portion which is radially extensible in the longitudinal direction of the drum.

11 Claims, 7 Drawing Figures

AXIALLY ADJUSTABLE FIRE CONSTRUCTION DRUM

The invention relates to an axially and radially adjustable construction drum for pneumatic tires in which the drum has a variable width and is radially extensible and comprises two basic members, the relative distance between which is adjustable on an internal tube through a spindle and a screwthreaded sleeve with screwthread portions of opposite directions, in which the basic members support ring segments whose external surfaces form approximately cylindrical working surfaces and which are radially adjustable through a bellows and on which is situated a resilient bandage with inflatable members disposed therebelow for holding over the edges of the plies and between which is retained a middle part which is radially extensible in the longitudinal direction of the drum, and in synchronization with said inflatable members.

Tire construction drums of this kind function as a support member for tire structures of the most diverse widths. Different tire sizes can be produced on these drums without the need for interchanging. The axial adjustability is defined by the width of the gap to the individual plates. This width must not exceed a specific value, otherwise there will be risk that the tire material will be pressed into the spaces between the individual segments in the course of the rolling operation.

It is necessary, more particularly for small tire manufacturing plants, to be able to use a tire construction machine with a tire construction drum which permits rapid but nevertheless exact resetting to different tire dimensions. Tire construction drums whose diameter can be correspondingly varied, are used to this end. It is, however, also desirable for the construction drum to be usable for different tire or belt widths.

The German Gebrauchsmuster No. 1 896 294 discloses a construction drum in which the overall width is adjusted by the segments, which are radially movable on the base members, being also adjustable in the axial direction through slots and screw fasteners. The space or annular gap produced between the two rows of segments is bridged by a spacer ring, a specific ring width being provided for each tyre dimension. Filling the annular gap by means of a spacer ring is important because only uniform, continuous working surfaces can be used for the construction of tire carcases or of reinforcing inserts over the entire drum width. Larger gaps in the middle region cause the tire carcase or the reinforcing belt to become deformed or partially pressed into the gap during the rolling operation. The width of the gap in the middle region of construction drums for the reinforcement inserts of belted tires should not exceed 8 mm. Width adjustment by means of the segments which are mounted in the slots is time-consuming because each segment row contains many individual segments and each segment in turn is secured by means of two screw fasteners.

The German Patent No. 1 729 644 also discloses a tire construction drum in which width adjustment is performed by means of a spindle with screwthread portions of opposite direction and nuts which are traversable thereon and act on the base members. The middle region between the two segment rows in this embodiment is also bridged by an intermediate ring. The intermediate rings of different width are comprised of fabric-reinforced rubber and are anchored on the segment rows by means of retractable pins. Beneath the resilient intermediate ring the gap is bridged by overlapping spring steel strips of arcuate shape. The additional steel strips are necessary because the resilient intermediate ring alone is not able to absorb the rolling forces.

An intermediate ring of different width is also employed in this drum for each adjusted width. Insertion of the intermediate rings is time-consuming and labour-intensive. Until they engage, the intermediate rings must be expanded and pulled over the drums, the friction between rubber surfaces which slip upon each other being particularly adverse. The overlapping spring steel strips can also damage or possibly destroy the covering rubber bandage.

It is the object of the present invention to provide an axially and radially adjustable tire construction drum of the kind described hereinbefore, the possible working width of which can be rapidly and reliably adjusted and expanded and which can be employed over a wide working range.

The problem is solved in that the middle part comprises plate segments which are resilient in the longitudinal direction of the drum, are slidably retained on guides which interconnect the segments of the basic members and whose plates bridge the distances between the segments by means of interposed spring cartridges. Due to their axial resilience and because of the compressive prestress, the inserted plate segments automatically equalize every adjustment so that the procedure of adjusting the width of the drum can be performed in a short time without requiring manipulation in the middle region.

Conventional drum embodiments called for resetting times of between 3 and 6 hours but in the embodiment according to the present invention the width can be adjusted within a few minutes.

To ensure that the distance between segments is equalized during adjustment of the drum width so that the gaps between the plates are identical, the invention also proposes that two spring cartridges are fixedly inserted into each plate of the plate segments, each end of said spring cartridges being mounted in a centring bore of the respective leading plate and the other end projects into a bore of each trailing plate, and in which the spring cartridges in one plate are diametrically offset around the guide bore with respect to the spring cartridges of the relevant succeeding plate. This step ensures reliable centering of the plate segments and the diametral offset enables spring cartridges to be inserted so that they simultaneously bias three plates in positive manner. To this end, the compressive prestress of the spring cartridges must be sufficiently high to ensure that all plates are shifted during adjustment, even with the maximum drum width.

According to the invention, the spring cartridges have a cup for the springs and a lid retained against the cup through an adjustable abutment which is preferably rigid in the thrust direction of the spring and the spring is prestressed in compression between the cup and the lid. To this end, the spring can comprise serially connected plate springs, one or more coil springs inserted into each other or a rubber spring. It is most convenient and involves the least expenditure in terms of construction technique to use a kind of spring cartridge since more than 1000 of such spring cartridges must be used in a construction drum having, for example, 2 × 26 segments.

The spring cartridges can be produced with a specific prestress or with a fixed longitudinal extension but it is also feasible for the prestress of the spring cartridge to be variable at will by means of an adjusting screw.

For reasons related to installation and in order to improve the positional stability of the plate segments between the segments, the invention also proposes that intermediate plates are inserted between each plate segment and the two adjacent segments of the base members. Parts of the spring cartridges of the first and last plate of the plate segment will then project into bores of the said intermediate plates.

Compressed air or a vacuum is normally required in the region of the segments to actuate various drum elements. It will then be advantageous if the guides comprise pipes, both ends of which are supported in the segments and are adapted to conduct a pressure medium or vacuum to the drum actuating elements. Additional pressure supply lines can then be omitted.

In one embodiment of the invention it is advantageous if, outside the adjustable middle part, the edge regions of the tire construction drum are provided with known peripheral bandages which have ground hollow-fillet indentations for accommodating the bead core. The peripheral bandages are interchangeable and the position of the ground hollow-fillet indentations can be varied on the said peripheral bandages. The distance between both bead cores of a tyre structure can thus again be varied by the amount of the distances between the appropriate ground indentations in the peripheral bandages. In the event of a dimension change which exceeds the adjustment width of the axially adjustable tire construction drum, it is not necessary in each case for the entire drum to be exchanged. It would sufficient to exchange the bandages. This operation is much simpler and can be performed much more rapidly and the space for storing the additional drums can also be saved.

The invention is described hereinbelow by reference to the accompanying drawings, in which.

Figure 1:
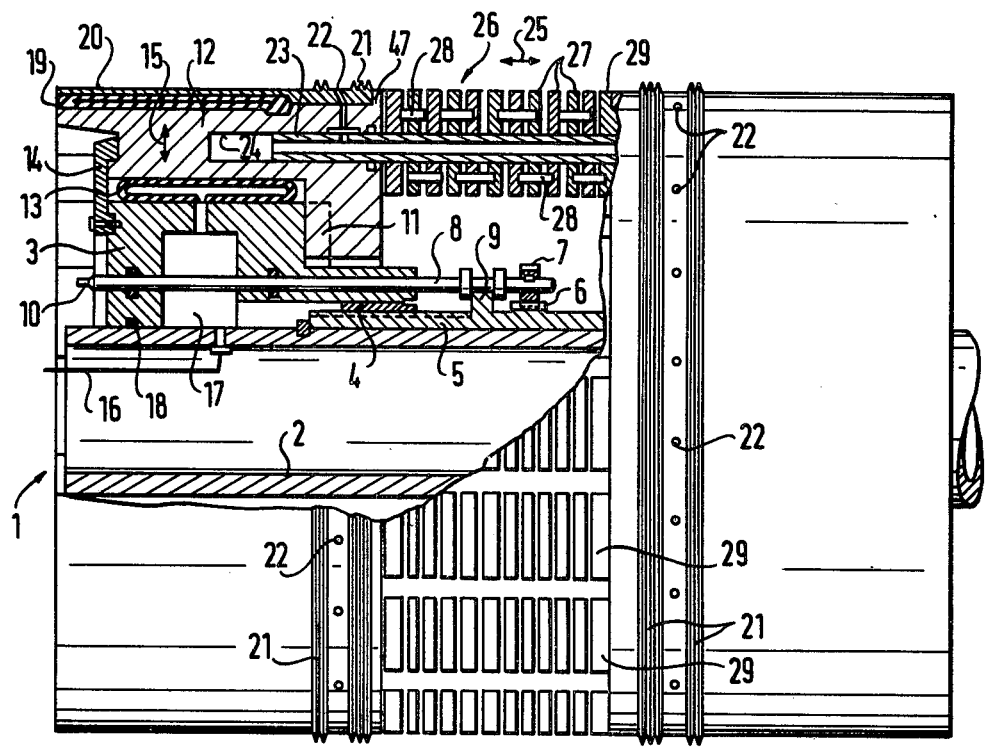
FIG. 1 shows an axially adjustable tyre construction drum.

The tire construction drum 1, shown partially in section in FIG. 1, for producing folded belts has a substantially cylindrical surface. The tire construction drum is retained by means of an internal tube 2 on a driving device which is not shwon. Two base members 3 situated opposite each other are arranged on the internal tube 2 so as to be slidable along the longitudinal direction of the drum, each member surrounding a screwthreaded nut 4. The screwthreaded nuts 4 have screwthreading portions of opposite direction and are in engagement with a sleeve 5 which is rotatable but is axially fixed on the internal tube 2. The sleeve 5 is also provided with a gear rim 6 which meshes with a pinion 7 of a spindle 8. The spindle 8 extends through the base member 3 and bears axially on a peripheral collar 9 of the sleeve 5. A square section 10 is integrally formed on the end of the spindle 8 to enable the latter to be rotated.

Segments 12, which are radially slidable over guides 11 and are adjacently disposed in the circumferential direction of the drum 1 so as to form an approximately cylindrical working surface, are situated on the base member 3. The segments 12 are slidable by means of bellows 13 to stop rings 14 (arrow 15). Air is supplied to the bellows 13, for example, through a duct 16 which extends into a chamber 17 in the base member 3 to which the bellows 13 are connected.

To this end, the guides of the spindle 8 and of the base member 3 on the internal tube 2 are sealed by means of gaskets 18. Inflatable elements 19 which are covered by a resilient bandage 20 are situated on the top of the segment rows — towards the edge of the drum 1. Near the inner edges of the segments 12 the bandage 20 has peripheral ribs 21 between which extend ports 22 which lead to the interior of the segments. The said ports 22 are connected to pipes 23 which are biased with vacuum. Each of the pipes 23 is supported in blind holes 24 of two oppositely disposed segments 12. The pipes are sealed with gaskets 47 and function as guides for the middle part 25 which bridges the distance between the segment rows. The middle part 25 comprises plate segments 26 each of which is associated with two oppositely disposed segments 12.

The plate segments 26 comprise individual plates 27. Spring cartridges 28, which overlap each other, are inserted under prestress between the said plates. Intermediate plates 29 are disposed between the plate segments 26 and the segments 12. The individual segments 27 are maintained at identical distances from each other by and with the spring cartridges.

Figure 2:
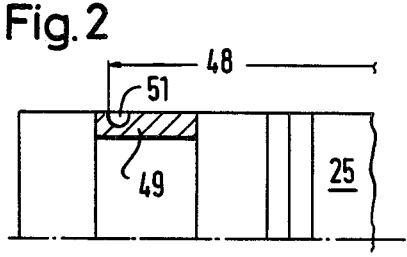
FIG. 2 shows a tire construction drum according to FIG. 1 with bandages for large distances between beads.
Figure 3:
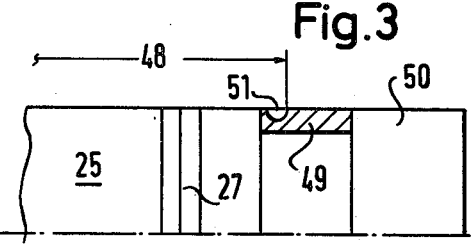
FIG. 3 shows a tire construction drum according to FIG. 1 for short distances between beads.

FIGS. 2 and 3 each show an axially and radially adjustable tire construction drum according to FIG. 1 with peripheral bandages 49 which have ground hollow-fillet indentations 51 in the edge regions 50. The distances 48 between the beads can be varied by interchanging the peripheral bandages 49.

Figure 4:
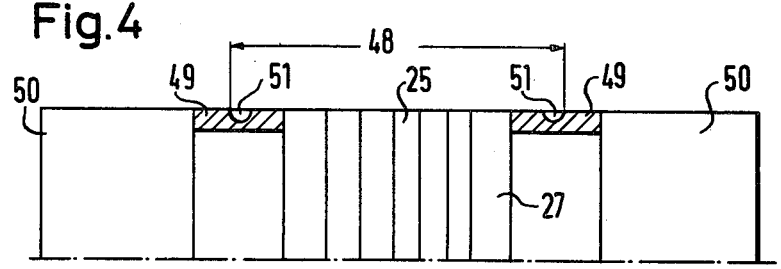
FIG. 4 shows another tire construction drum according to FIG. 1 for even shorter distances between beads.

FIG. 4 shows a tire construction drum 1 in which the distance 48 between the beads is reduced so that the ground hollow-fillet indentations 51 are situated outside the peripheral bandages 49 of the tyre construction drum of the kind illustrated in FIGS. 2 and 3. It is only in a case of this kind in which the entire tyre construction drum 1 must be exchanged.

Figure 5:
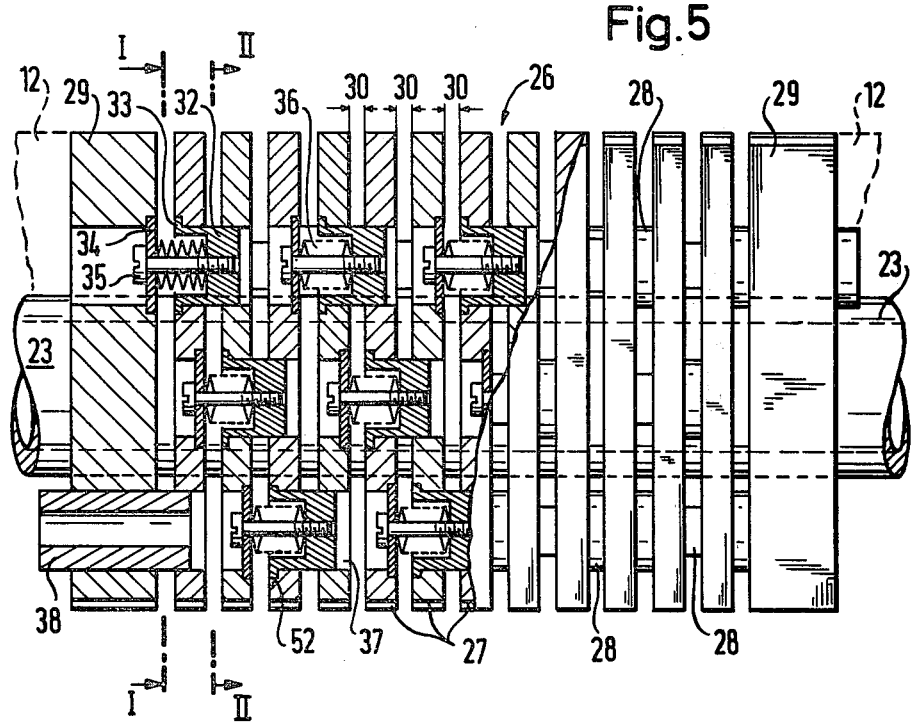
FIG. 5 is a section through a plate segment according to FIG. 1.
Figure 6:
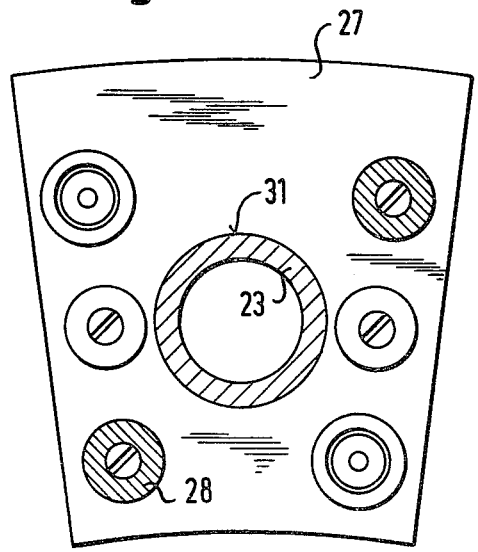
FIGS. 6 and 7 are sectional views I and II of the plate segment according to FIG. 5.
Figure 7:
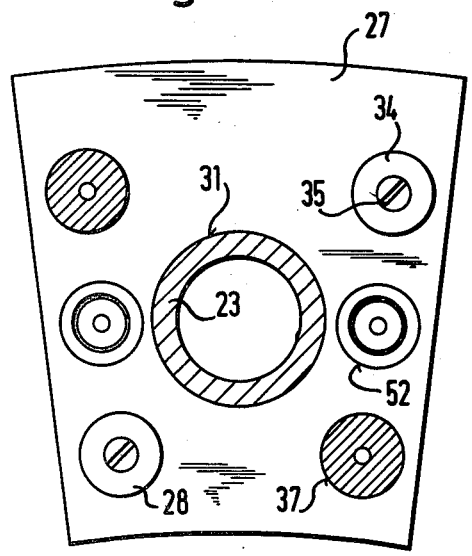

The construction of the plate segments 26 is shown more clearly in FIG. 5. The cross-sectional shape of the plate segments 26 corresponds to the outer region of the segments 12 (FIGS. 6 and 7). They are inserted through intermediate plates 29 between the segment rows. Each plate segment 26 has twelve plates 27 which are guided on the tube 23 at identical distances 30. The space between plates 27 is maintained by the spring cartridges 28. Two spring cartridges 28 which are diametrally offset about a guide bore 31 are provided in each plate 27. The spring cartridges comprise a cup 32, the edge flange 33 of which is pressed into a centering bore 52 of the appropriate plate 27, held by adhesive bonding, and whose rear end slides in a bore of the succeeding plate. At the front, the spring cartridges 28 have lids 34 by means of which they are pressed into the leading plate or into the intermediate plate. A prestressed spring fills the free space 36 between the lid 34 and the cup 32. The prestress is obtained by means of a rigid stop abutment, for example, an adjusting screw 35, which also guides the lid 34 with respect to the cup 32.

The step by which the spring cartridges 28 are secured in centering bores 52 of the plate 27 and the preceding plate or the intermediate plate and the succeeding plate or the other intermediate plate 29, are positively biased ensures proper centering through all plates 27 and ensures that the plate segments 26 are correctly positioned on the tube 23 as the said plate segments 26 would otherwise rotate on the tube 23. It is, of course, also feasible to interpose a square-section guide or two guide elements between the segments 12 on which the position of the plate segments 26 would then be ensured without the aid of the spring cartridges 28. In this case it would be possible to incorporate simpler springs between the plates, the function of such springs being purely to maintain the distance between the individual plates 27.

FIGS. 6 and 7 which are views of the first two plates of the plate segment 26 shown as a longitudinal section in FIG. 5 clearly show the diametral offset of the individual spring cartridges. This is necessary to prevent the cartridges abutting against each other when the plates 27 bear completely upon each other (minimum drum width).

Centering sleeves 38 are inserted into the intermediate plate 29 to provide additional centring for the plate segments and to function as an assembly aid, the said sleeves on the one hand engaging with the segments 12 and on the other hand with the plate which is the first plate in each case.

Figure 8:
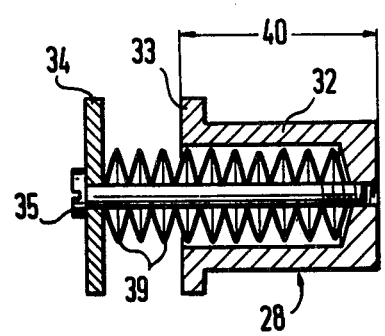
FIGS. 8 and 9 show two embodiments of spring cartridges according to FIG. 5.
Figure 9:
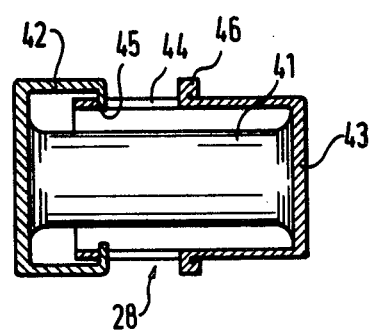

FIGS. 8 and 9 show embodiments of spring cartridges 28. The embodiment according to FIG. 8 contains serially connected plate springs 39 as a resilient element, the said plate springs being compressively prestressed by means of the adjusting screw 35 between the lid 34 and the cup 32. The compressive prestress is sufficiently large to ensure in each case that, with the drum set to the maximum adjusting width, there will still be sufficient spring force to ensure that the friction of the plates 27 on the tube 23 is overcome in the course of adjustment. The length 40 of the cup 32 is adapted so that the spring cartridges cannot abut against each other even if the plates bear completely upon each other.

The embodiment of the spring cartridge 28 according to FIG. 9 differs from that of the previously described embodiment. The resilient element in this case is a rubber spring 41 which is accommodated between two cups 42 and 43 which are telescoped into each other, the length of the spring cartridge 28 being defined by noses 45 which slide in slots. The rubber spring 41 in this case is also prestressed in compression so that it is able to overcome the pull-out moment of the plates 27 even when the drum 1 is adjusted to its maximum width. To mount this embodiment of a spring cartridge the cup 43 is provided with a peripheral flange 46 which conveniently comprises wall material associated with the cup 43 and deformed when the slots 44 are produced. The rubber spring 41 can be secured between the bottom of the cups 42 and 43. To ensure reliable functioning it would also be sufficient if the rubber spring is housed without being affixed between the cups.

Width adjustment of the drum 1 is initiated by rotation of the spindle 8. Advantageously, the spindle 8 is actuated by means of a withdrawable crank handle which is not shown and the end of the spindle is secured by a locking device to prevent unintentional rotation. As the pinion 7 rotates the sleeve 5 through the gear rim 6, the nuts 4 and therefore the two base members 3 move towards each other or away from each other, depending on the direction of rotation of the spindle 8. The tubes 23 slide in the blind holes 24. The spring cartridges 28 compel the plates 27 to automatically equalize the distance between the segments 12.

In practice, a belt construction drum of this kind has a width adjustment of approximately 40 mm. This means that the plates are situated at a distance of approximately 3 mm from each other with the drum set to the greatest width. These distances are of no significance for any rolling operations in the middle region of the drum because the processed reinforcing fabric is not pressed into these narrow gaps.

In the narrowest position of the drum, the plates 27 bear upon each other and present an integral, cylindrical working surface. The times required for adjustment, which used to very long, can be reduced to a few minutes with the previously described setting because of the elimination of the need of exchanging any intermediate rings or spacer rings. Initial installation of the plate segments 26 can be simplified by prefabrication with the spring cartridges 28 and by packaging to their narrowest widths by means of tensioning bands. They are then slid on to the guides between the segments, the tensioning bands are then released, after which each plate segment automatically fills the space.

Suitably modified plate segments can, of course, also be employed for other drum intended for the construction of tire components. They need merely be adapted to the appropriate conditions and must be provided with suitably modified spring cartridges for longer operating distances or shorter or wider gaps.

What is claimed:

1. An axially and radially adjustable construction drum for pneumatic tires in which the drum has variable width and is radially extensible and comprises two basic members the relative distance between which is adjustable on an internal tube through a spindle and a screwthreaded sleeve with screwthread portions of opposite direction, in which the basic members support ring segments whose external surfaces form approximately cylindrical working surfaces and which are radially adjustable through bellows and on which is situated a resilient bandage with inflatable members disposed therebelow for holding over the edges of plies and between which is retained a middle part which is radially extensible in the longitudinal direction of the drum, characterized in that a middle part is comprised of plate segments which are resilient in the longitudinal direction of the drum, are slidably retained guide means which interconnect segments of basic members with plates that bridge the distances between the segments by means of interposed spring cartridges.

2. A tire construction drum according to claim 1, characterized in that the distances between the segments are of equal width.

3. A tire construction drum according to claims 1 and 2, characterized in that two spring cartridges are fixedly inserted into each plate of the plate segments, each end of said spring cartridges being mounted in a centering bore of the respective leading plate and the other end projects into a bore of each trailing plate, and in which the spring cartridges in one plate are diametrically offset around a guide bore with respect to the spring cartridges of the relevant succeeding plate.

4. A tire construction drum according to claim 3, characterized in that the spring cartridges have a cup to receive springs and a lid retained against the cup through an adjustable abutment means which is preferably rigid in the thrust direction of the spring and the spring is prestressed in comprsssion between the cup and the lid.

5. A tire construction drum according to claim 4, characterized in that the spring comprises serially connected plate springs.

6. A tire construction drum according to claim 5, characterized in that intermediate plates are inserted between each plate segment and the two adjacent segments of the base members.

7. A tire construction drum according to claim 6, characterized in that the guides comprise pipes, both ends of which are supported in the segments and are adapted to conduct pressure medium or vacuum to the drum actuating elements.

8. A construction drum according to claim 7, characterized in that the width adjusting device contains a sleeve which is rotatable on an internal tube and has two portions of external screwthreading of opposite direction, each engaging with a nut on the base members, and a spindle is axially supported on a sleeve, meshes with a pinion with a gear rim provided on the sleeve and is guided with respect to the exterior by means of one of the base members.

9. A tire construction drum according to claim 8, characterized in that outside the adjustable middle part the edge regions of the tire construction drum are provided with predetermined peripheral bandages which have ground hollow-fillet indentations for accommodating the bead core.

10. Tyre construction drum according to claim 9, characterized in that the position of the ground hollow-fillet indentations (51) can be varied on the peripheral bandages (49).

11. A construction drum according to claim 10, characterized in that the peripheral bandages are interchangeable.

* * * * *